United States Patent [19]

Marx et al.

[11] Patent Number: 5,067,794
[45] Date of Patent: Nov. 26, 1991

[54] IR-PANCRATIC OPTICAL DEVICE

[75] Inventors: Dieter Marx, Aalen-Waldhausen; Axel Kampf, Königsbronn, both of Fed. Rep. of Germany

[73] Assignee: Carl-Zeiss-Stiftung, Heidenheim, Fed. Rep. of Germany

[21] Appl. No.: 550,900

[22] Filed: Jul. 11, 1990

[30] Foreign Application Priority Data

Jul. 22, 1989 [DE] Fed. Rep. of Germany ....... 3924269

[51] Int. Cl.$^5$ .............................................. G02B 7/02
[52] U.S. Cl. .................................. 359/824; 354/195.12; 354/400; 359/692; 359/699; 359/354
[58] Field of Search ............... 350/255, 254, 429, 257, 350/430; 354/195.12, 195.13, 400

[56] References Cited

U.S. PATENT DOCUMENTS

| | | | |
|---|---|---|---|
| 3,765,751 | 10/1973 | Noguchi | 350/255 |
| 4,148,548 | 4/1979 | Thompson | 350/429 |
| 4,583,827 | 4/1986 | Tokunaga et al. | 350/429 |
| 4,609,260 | 9/1986 | Kawai | 350/430 |
| 4,749,268 | 6/1988 | Moskovich et al. | 350/429 |

FOREIGN PATENT DOCUMENTS 2586828 3/1987 France .

*Primary Examiner*—Loha Ben
*Attorney, Agent, or Firm*—Walter Ottesen

[57] ABSTRACT

The invention is directed to an IR-pancratic optical device which includes a drive for displacing optical members thereof. The drive permits the focal length range to be passed through in 0.5 second. The drive includes a rotatably mounted drum on which a steel band is attached. Redirecting roller guides are provided to enable the rotational movement to be translated into a linear movement. The IR-pancratic optical device includes forward and rearward optical members and two intermediate optical members are arranged therebetween. One of the intermediate optical members is attached to the band and is moved along the optical axis. A cam control couples the movement of the second intermediate optical member to the movement of the first intermediate optical member.

6 Claims, 1 Drawing Sheet ns
IR-PANCRATIC OPTICAL DEVICE

FIELD OF THE INVENTION

The invention relates to an IR-pancratic optical device for making observations in the IR-wavelength range. The IR-pancratic optical device includes a forward optical member, a rearward optical member and two intermediate optical members displaceable relative to each other.

BACKGROUND OF THE INVENTION

Infrared objectives are configured as pancratic systems to compensate for the defocusing effects of temperature fluctuations on the one hand, and to provide focal width changes for targets which move away rapidly such as flying objects.

It is known to displace the intermediate optical members of an infrared objective with the aid of a motor via gearing, threaded spindles and control cams. Such a pancratic infrared objective is disclosed, for example, in French patent publication 2,586,828. A disadvantage of this known IR-pancratic optical device is that the speed of displacement of the optical members is inadequate to sharply image a rapidly moving target such as a missile or a rocket as it moves along its path detectable through the entire focal length range.

SUMMARY OF THE INVENTION

It is an object of the invention to provide a drive and a control for an IR-pancratic optical device which permit the focal length range to be passed through in 0.5 second.

The IR-pancratic optical device of the invention includes: a forward optical member; a rearward optical member mounted rearward of the forward optical member and defining an optical axis therewith; first and second intermediate optical members disposed along the axis between the forward and rearward optical members; rotation means for providing a rotational movement; conversion means for converting the rotational drive movement into a translatory movement and imparting the translatory movement to the first intermediate optical member for movement along the axis; and, coupling means for position-dependently coupling the intermediate optical members to each other so as to cause the second intermediate optical member to undergo a predetermined movement in response to a linear movement of the first intermediate optical member along the axis.

The rotation means can include a drum rotatably mounted on a holding structure and this drum can be driven by a torque motor arranged inside the drum.

The IR-pancratic optical device according to the invention includes the holding structure on which the drum is rotatably mounted. Each of the intermediate optical members includes a lens and a holder for holding the lens. The holding structure can include a longitudinal guide for engaging and journalling the holders of the intermediate optical members to guide the same along the optical axis.

According to another feature of the invention, the coupling means includes an arm pivotally mounted on the holding structure and this arm has a first cam surface formed therein. The holder of the first intermediate optical member has a first cam provided thereon for engaging the first cam surface to produce a pivot movement of the arm. The arm also has a second cam surface formed therein and the holder of the second intermediate optical member has a second cam provided thereon for engaging and following the second cam surface in response to the pivot movement of the arm thereby moving the second intermediate optical member relative to the first intermediate optical member.

A position transducer such as a potentiometer can be arranged on the drum and the time sequence of the displacements can be controlled as desired via pregiven control curves.

It is advantageous to select the diameter of the drum so that a ¾-rotation corresponds to the entire displacement range of the first intermediate optical member.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
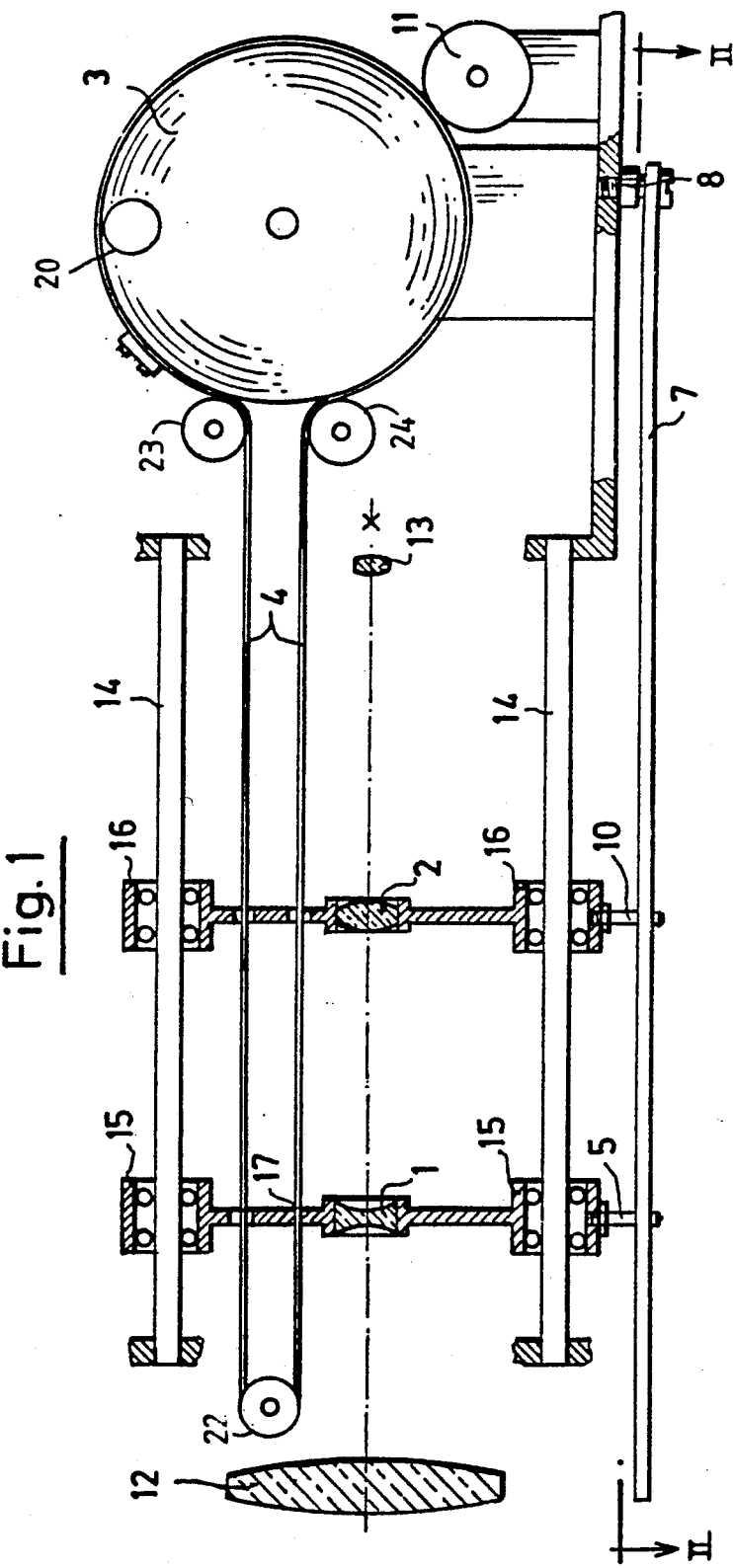
FIG. 1 is a schematic of an IR-pancratic optical device according to the invention and includes a drive for displacing the intermediate optical members; and, FIG. 2 is a section view taken along line II—II of FIG. 1 and includes a plan view of the pivot arm.
Figure 2:
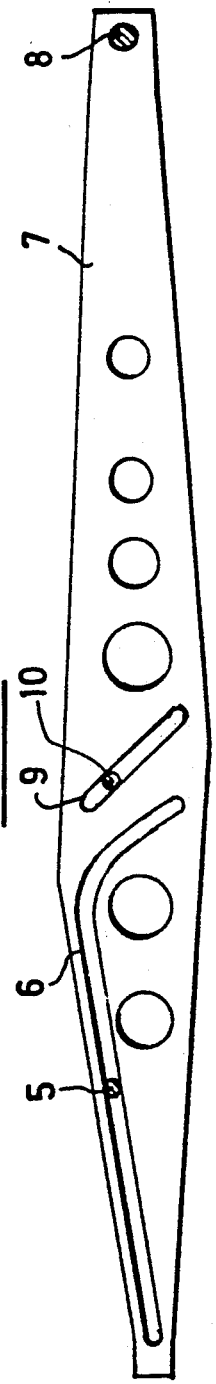

The pancratic optical device shown in FIG. 1 includes a forward lens 12 and a rearward lens 13. Intermediate lenses 1 and 2 of the pancratic optical device are provided with respective holders (15, 16) journalled in a longitudinal guide 14. Drum 3 defines an interior and is rotatably driven by a torque motor 20 disposed in the interior thereof. A steel band 4 is attached to the periphery of the drum 3 and the rotational movement of the drum is converted into a linear movement as shown with the aid of redirecting guide rollers (22, 23, 24). The diameter of the drum is so dimensioned that a ¾-rotation corresponds to the entire displacement range of the intermediate optical member 1.

The first intermediate optical member 1 is fixedly attached to the steel band 4 at the location identified by reference numeral 17. In this way, a movement of the first intermediate optical member 1 along the optical axis is provided by a rotation of the drum. A pin 5 is provided on the holder 15 of the first intermediate optical member 1 and engages in a cam 6 disposed in the pivot arm 7. If the pin 5 now moves along the optical axis, then the arm 7 pivots outwardly about pivot point 8.

A second cam 9 is provided in the arm 7 and imparts a movement to the second intermediate optical member 2 which is relative to the first intermediate optical member 1. The second cam 9 imparts the movement to the second intermediate optical member via a pin 10 mounted on the holder 16 thereof. The cams 6 and 9 can be so configured that the relative movement of the two intermediate optical members corresponds to the values pregiven in the optical computation. The time sequence of the displacement can be controlled as desired via a position transducer 11 in the form of a potentiometer.

It is understood that the foregoing description is that of the preferred embodiments of the invention and that various changes and modifications may be made thereto without departing from the spirit and scope of the invention as defined in the appended claims.

What is claimed is:

1. An IR-pancratic optical device comprising:
   a forward optical member;

a rearward optical member mounted rearward of said forward optical member and defining an optical axis therewith;

first and second intermediate optical members disposed along said axis between said forward and rearward optical members;

rotation means for providing a rotational movement;

conversion means for converting said rotational movement into a translatory movement and imparting said translatory movement to said first intermediate optical member for movement along said axis;

coupling means for position-dependently coupling said intermediate optical members to each other so as to cause said second intermediate optical member to undergo a predetermined movement in response to a linear movement of said first intermediate optical member along said axis;

a holding structure;

said rotation means including a drum rotatably mounted on said holding structure and defining an outer periphery;

said conversion means including: a band attached to said outer periphery so as to permit a first portion of said band to move in a rotational direction; redirecting means for directing a second portion of said band to move in a linear direction; and, said first intermediate optical member being attached to said second portion of said band.

2. The IR-pancratic optical device of claim 1, said rotation means further including a torque-motor means arranged in the interior of said drum for imparting said rotational movement thereto.

3. The IR-pancratic optical device of claim 1, each of said intermediate optical members including a lens and a holder for holding said lens; and, said holding structure including longitudinal guide means for engaging and journalling the holders of said intermediate optical members, respectively, to guide said intermediate optical members along said axis.

4. The IR-pancratic optical device of claim 3, said coupling means including an arm pivotally mounted on said holding structure and having a first cam surface formed therein; the holder of said first intermediate optical member having a first cam follower provided thereon for engaging said first cam surface to produce a pivot movement of said arm; said arm having a second cam surface formed therein; the holder of said second intermediate optical member having a second cam follower provided thereon for engaging and following said second cam surface in response to said pivot movement thereby moving said second intermediate optical member relative to said first intermediate optical member.

5. The IR-pancratic optical device of claim 4, further comprising a position transducer operatively connected to said drum for supplying a signal indicative of the angular position of said drum for use in controlling the time sequence of the respective displacements of said first and second intermediate optical members.

6. The IR-pancratic optical device of claim 5, said drum having a diameter selected so as to cause a ¾ rotation of said drum to correspond to the entire displacement range of said first intermediate optical member.

* * * * *